(12) United States Patent
Homan et al.

(10) Patent No.: US 6,690,170 B2
(45) Date of Patent: Feb. 10, 2004

(54) ANTENNA STRUCTURES FOR ELECTROMAGNETIC WELL LOGGING TOOLS

(75) Inventors: Dean M. Homan, Sugar Land, TX (US); Gary A. Hazen, Houston, TX (US); Richard A. Rosthal, Houston, TX (US); David L. Smith, Stafford, TX (US); Thomas D. Barber, Houston, TX (US); Paul Michael Ray, Missouri City, TX (US); Jacques R. Tabanou, Houston, TX (US)

(73) Assignee: Schlumberger Technology Corporation, Sugar Land, TX (US)

( * ) Notice: Subject to any disclaimer, the term of this patent is extended or adjusted under 35 U.S.C. 154(b) by 6 days.

(21) Appl. No.: 10/113,686

(22) Filed: Mar. 29, 2002

(65) Prior Publication Data

US 2003/0184304 A1 Oct. 2, 2003

(51) Int. Cl.⁷ .............................. G01V 3/10; G01V 3/18
(52) U.S. Cl. ............................................ 324/339
(58) Field of Search ........................ 324/338, 339–343, 324/346, 356, 369; 343/742, 741, 866, 867

(56) References Cited

U.S. PATENT DOCUMENTS

| | | | | |
|---|---|---|---|---|
| 2,787,788 A | * | 4/1957 | Clough | 343/867 |
| 3,723,856 A | * | 3/1973 | Brown | 324/303 |
| 4,049,334 A | * | 9/1977 | Siden | 439/55 |
| 4,319,191 A | | 3/1982 | Meador et al. | |
| 5,602,557 A | | 2/1997 | Duerr | |
| 5,633,649 A | | 5/1997 | Grossi et al. | |
| 5,781,436 A | | 7/1998 | Forgang et al. | |
| 6,084,052 A | | 7/2000 | Aufdermarsh et al. | |
| 6,208,031 B1 | | 3/2001 | Fraivillig | |
| 6,249,259 B1 | | 6/2001 | Goodman et al. | |
| 6,300,762 B1 | | 10/2001 | Thomas, Jr. et al. | |
| 6,351,127 B1 | | 2/2002 | Rosthal et al. | |
| 6,452,388 B1 | * | 9/2002 | Reiderman et al. | 324/303 |

FOREIGN PATENT DOCUMENTS

| | | |
|---|---|---|
| GB | 2 303 215 | 2/1997 |
| GB | 2 337 546 | 11/1999 |
| GB | 2 380 550 | 4/2003 |

* cited by examiner

*Primary Examiner*—N. Le
*Assistant Examiner*—Reena Aurora
(74) *Attorney, Agent, or Firm*—Victor H. Segura; Brigitte L. Jeffery; John J. Ryberg

(57) ABSTRACT

The invention refers to antenna configurations for electromagnetic logging tools. The antennas have one or more electrical conductors disposed on a dielectric substrate wrapped around a core or disposed directly on the core. The conductor or conductors are arranged such that the antenna has a first magnetic dipole moment substantially perpendicular to a longitudinal axis of the core. The invention also refers to antennas adapted for mutual balancing using interleaved conductive paths or disks to alter the magnetic dipole moments to mutually balance the antenna system.

69 Claims, 8 Drawing Sheets

ANTENNA STRUCTURES FOR ELECTROMAGNETIC WELL LOGGING TOOLS

CROSS-REFERENCE TO RELATED APPLICATIONS

Not applicable.

STATEMENT REGARDING FEDERALLY SPONSORED RESEARCH OR DEVELOPMENT

Not applicable.

BACKGROUND OF THE INVENTION

1. Field of the Invention

The invention relates generally to electromagnetic well logging apparatus. More specifically, antenna structures for such well logging apparatus.

2. Background Art

Electromagnetic (EM) based instruments for measuring properties of matter or identifying its composition are well known. The nuclear magnetic resonance (NMR) technique has been used to form images of biological tissues or to determine the composition of, for example, earth formations. The values of electrical conductivity for biological samples or for earth formations have been obtained through the use of electromagnetic induction tools. EM propagation well logging devices are also well known, and are used for measuring basic parameters such as amplitude and phase shift of EM waves being propagated through a medium in order to determine specific properties of the medium.

Electrical conductivity (or its inverse, resistivity) is an important property of subsurface formations in geological surveys and prospecting for oil, gas, and water because many minerals, and more particularly hydrocarbons, are less conductive than common sedimentary rocks. Thus a measure of the conductivity is often a guide to the presence and amount of oil, gas, or water. Induction logging methods are based on the principle that varying electric currents, due to their associated changing magnetic flux, induce electric currents.

Propagation logging instruments generally use multiple longitudinally-spaced transmitter antennas operating at one or more frequencies and a plurality of longitudinally spaced receiver pairs. An EM wave is propagated from the transmitter antenna into the formation in the vicinity of the borehole and is detected at the receiver antenna(s). A plurality of parameters of interest can be determined by combining the basic measurements of phase and amplitude. Such parameters include the resistivity, dielectric constant and porosity of the formation as well as, for example, the degree to which the fluid within the borehole migrates into the earth formation.

The transmitter antennas on induction logging instruments generate a time-varying magnetic field when a time-varying electric current is applied to them. The time-varying magnetic field induces eddy currents in the surrounding earth formations. The eddy currents induce voltage signals in the receiver antennas, which are then measured. The magnitude of the induced voltage signals varies in accordance with the formation properties. In this manner, the formation properties can be determined.

Conventional antennas consist of coils mounted on the instruments with their axes parallel to the instrument's central or longitudinal axis. Therefore, the induced magnetic field is also parallel to the central axis of the well and the corresponding induced eddy currents make up loops lying in planes perpendicular to the well axis.

The response of the described induction logging instruments, when analyzing stratified earth formations, strongly depends on the conductive layers parallel to the eddy currents. Nonconductive layers located within the conductive layers will not contribute substantially to the response signal and therefore their contributions will be masked by the conductive layers' response. Accordingly, the nonconductive layers are not detected by typical logging instruments.

Many earth formations consist of conductive layers with non-conductive layers interleaved between them. The non-conductive layers are produced, for example, by hydrocarbons disposed in the particular layer. Thus conventional logging instruments are of limited use for the analysis of stratified formations.

Solutions have been proposed to detect nonconductive layers located within conductive layers. U.S. Pat. No. 5,781,436 describes a method that consists of selectively passing an alternating current through transmitter coils inserted into the well with at least one coil having its axis oriented differently from the axis orientation of the other transmitter coils.

The coil arrangement shown in U.S. Pat. No. 5,781,436 consists of several transmitter coils with their centers distributed at different locations along the instrument and with their axes in different orientations. Several coils have the usual orientation, i.e., with their axes parallel to the instrument axis, and therefore to the well axis. Others have their axes perpendicular to the instrument axis. This latter arrangement is usually referred to as a transverse coil configuration.

Thus transverse EM logging techniques use antennas whose magnetic moment is transverse to the well's longitudinal axis. The magnetic moment m of a coil or solenoid-type antenna is represented as a vector quantity oriented parallel to the induced magnetic field, with its magnitude proportional to the corresponding magnetic flux. In a first approximation, a coil with a magnetic moment m can be seen as a dipole antenna due to the induced magnetic poles.

In some applications it is desirable for a plurality of magnetic moments to have a common intersection but with different orientations. For example, dipole antennas could be arranged such that their magnetic moments point along mutually orthogonal directions. An arrangement of a plurality of dipole antennas wherein the induced magnetic moments are oriented orthogonally in three different directions is referred to as a triaxial orthogonal set of magnetic dipole antennas.

A logging instrument equipped with an orthogonal set of magnetic dipole antennas offers advantages over an arrangement that uses standard solenoid coils distributed at different axial positions along the instrument with their axes in different orientations, such as proposed in U.S. Pat. No. 5,781,436.

However, it is not convenient to build orthogonal magnetic dipole antennas with conventional solenoid coils due to the relatively small diameters required for logging instruments. Arrangements consisting of solenoid coils with their axes perpendicular to the well's central axis occupy a considerable amount of space within the logging instrument.

In addition to the transmitter coils and the receiver coils, it is also generally necessary to equip the logging instrument with "bucking" coils in which the magnetic field induces an electric current in the receiver coils opposite and equal in magnitude to the current that is induced in the receiver coil when the instrument is disposed within a non-conducting medium such as, for example, air. Bucking coils can be connected in series either to the transmitter or the receiver coil. The receiver's output is set to zero by varying the axial distance between the transmitter or receiver coils and the bucking coils. This calibration method is usually known as mutual balancing.

Transverse magnetic fields are also useful for the implementation of NMR based methods. U.S. Pat. No 5,602,557, for example, describes an arrangement that has a pair of conductor loops, each of which is formed by two saddle-shaped loops lying opposite one another and rotationally offset 90° relative to one another.

SUMMARY OF INVENTION

An aspect of the invention is an antenna for an electromagnetic well logging tool. The antenna comprises a core, the core including a substantially cylindrical outer surface, the outer surface having channels and pins adapted to retain a first electrical conductor in a predetermined pattern, the first electrical conductor disposed in the channels; the predetermined pattern adapted to cause the antenna to have a first magnetic dipole moment substantially perpendicular to a longitudinal axis of the core.

Another aspect of the invention is an antenna for an electromagnetic logging tool. The antenna comprises a core; an electrical conductor disposed on a dielectric substrate, the substrate wrapped around the core and disposed such that the antenna has a first magnetic dipole moment substantially perpendicular to a longitudinal axis of the core.

Another aspect of the invention is an antenna for an electromagnetic logging tool. The antenna comprises a core, having a substantially cylindrical outer surface, the outer surface having channels and pins adapted to retain electrical conductors in a predetermined pattern, the predetermined pattern adapted to cause first and second electrical conductors to have a first and second magnetic dipole moment substantially perpendicular to a longitudinal axis of the core, the first and second electrical conductors disposed in the channels and adapted to have the second magnetic dipole moment pointing in a different direction from the first magnetic moment.

Another aspect of the invention is an antenna for an electromagnetic logging tool. The antenna comprises a core; an electrical conductor disposed an a dielectric substrate, the substrate wrapped around the core, the conductor forming first and second conductive paths, the first and second conductive paths arranged to have a first and second dipole magnetic dipole moment substantially perpendicular to a longitudinal axis of the core, the second magnetic dipole moment pointing in a direction different from the first magnetic moment.

Another aspect of the invention is a well logging tool comprising a support having at least one antenna mounted thereon; and processing circuitry electrically coupled to the at least one antenna, wherein the at least one antenna comprises a core having a substantially cylindrical outer surface, the outer surface having channels and pins adapted to retain at least one electrical conductor in a predetermined pattern, the predetermined pattern arranged such that first and second electrical conductors disposed in the channels have a first and second magnetic dipole moment substantially perpendicular to a longitudinal axis of the core, the second magnetic dipole moment pointing in a direction different from the first magnetic moment.

Another aspect of the invention is a well logging tool comprising a support having at least one antenna mounted thereon; and processing circuitry electrically coupled to the at least one antenna, wherein the at least one antenna comprises a dielectric substrate wrapped around a core, the substrate having an electrical conductor disposed thereon, the conductor forming first and second conductive paths, the first and second conductive paths arranged to have a first and second magnetic dipole moment substantially perpendicular to a longitudinal axis of the core, the second magnetic dipole moment pointing in a different direction from the first magnetic moment.

Other aspects and advantages of the invention will be apparent from the following description and the appended claims.

BRIEF DESCRIPTION OF DRAWINGS

FIG. 5b is a cross section of the core structure of FIG. 5a.

DETAILED DESCRIPTION

Figure 1:
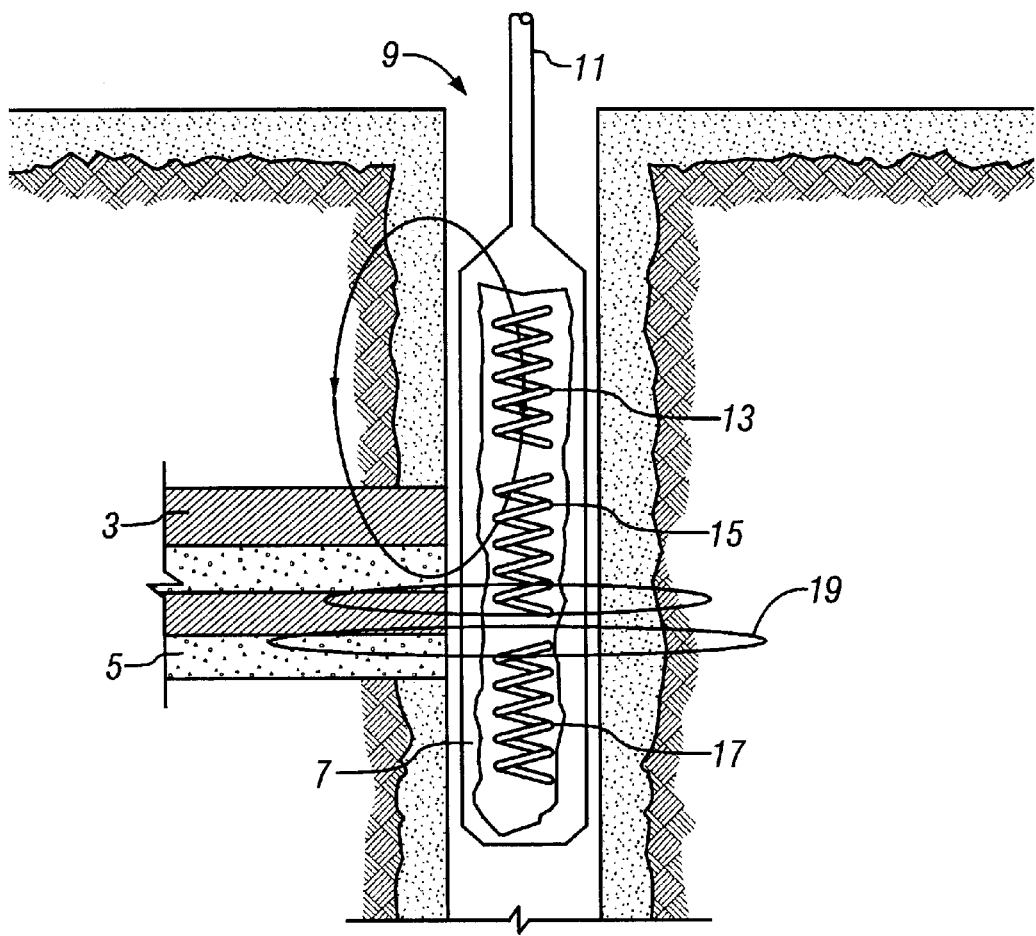
FIG. 1 shows a logging instrument disposed in a well bore penetrating an earth formation.

FIG. 1 shows a well (9) extending into an earth formation that includes layers of conductive (3) and non-conductive (5) material. A logging tool (7) is disposed within the well (9) on a wireline (11). The tool (7) includes transmitter coils (13), receiver coils (15) and bucking coils (17) with their axes parallel to the tool axis and thus the well axis. The magnetic field produced by the transmitter coils (13) induce eddy currents (19), which are detected by the receiver coils (15).

Figure 2A:
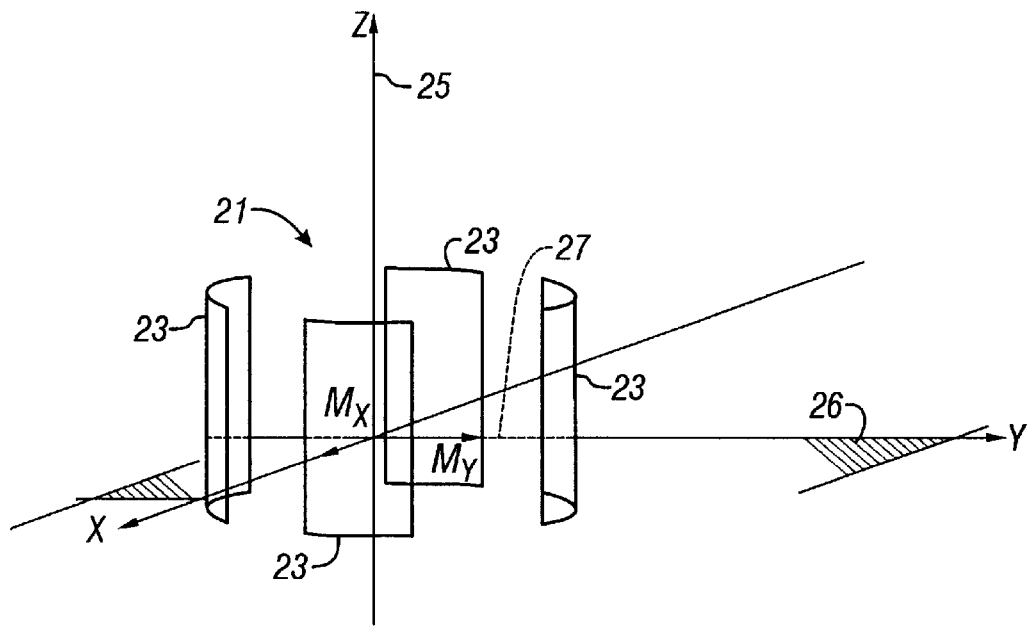
FIG. 2a is a schematic diagram of a transverse electromagnetic apparatus in accord with the invention.

FIG. 2a shows an arrangement for a transverse EM apparatus (21) in accordance with one embodiment of the invention. The transverse EM apparatus (21) includes a plurality of coils (23) disposed around a central axis (25)

such that the coils' normal vectors (27) are perpendicular to the central axis (25).

Figure 2B:
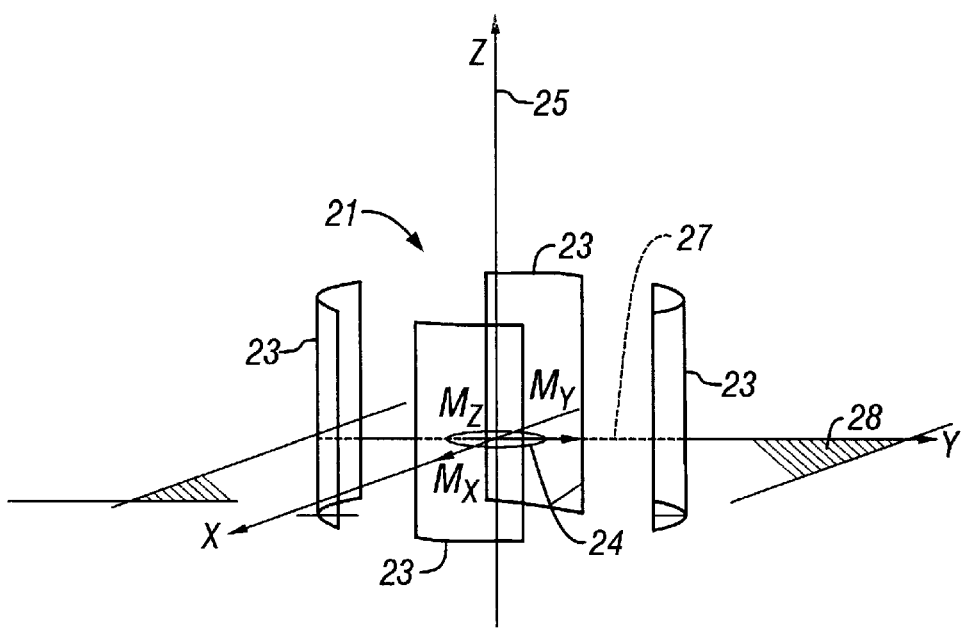
FIG. 2b is a schematic diagram of a transverse electromagnetic apparatus in accord with the invention.

FIG. 2b shows another arrangement for the transverse EM apparatus (21) in accordance with an embodiment of the invention. In this case an additional coil (24) has been added to the arrangement of FIG. 2a such that its normal vector is parallel to central axis (25).

FIGS. 2a and 2b show an orthogonal set of magnetic dipole antennas whose magnetic moments all have a common origin. This will provide, on a plane (26,28), i.e. at the same well depth, magnetic fields pointed in directions x,y for the arrangement of FIG. 2a and x,y,z for the arrangement of FIG. 2b. A triaxial orthogonal set of magnetic dipole antennas, located at a selected distance from the transmitter, will correspondingly be able to receive and detect the eddy currents that travel in loops parallel and perpendicular to the tool axis.

Figure 3:
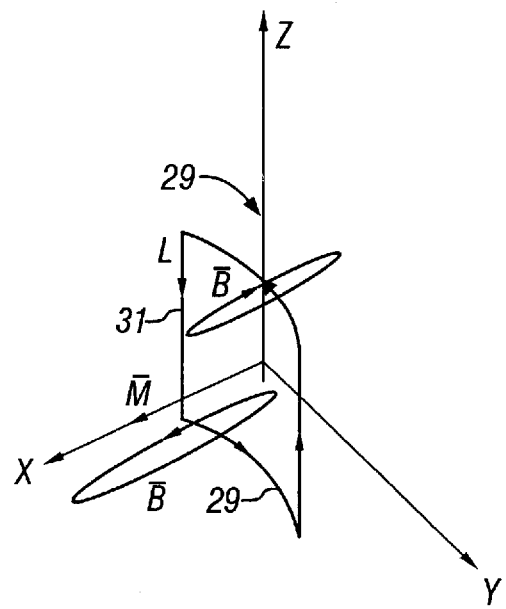
FIG. 3 is a schematic diagram of an antenna loop in accord with an embodiment of the invention.

FIG. 3 shows one of the plurality of coils (23) of the invention in more detail. A coil (23) consists of two arcs (29) with their ends united by two lines (31). A current i traveling around the coil (23) induces a magnetic field B that surrounds each element of the coil. The y and z components of the magnetic field sum to zero due to the symmetry of the coil. Therefore, the coil has a magnetic moment m only parallel to the x coordinate.

Figure 4:
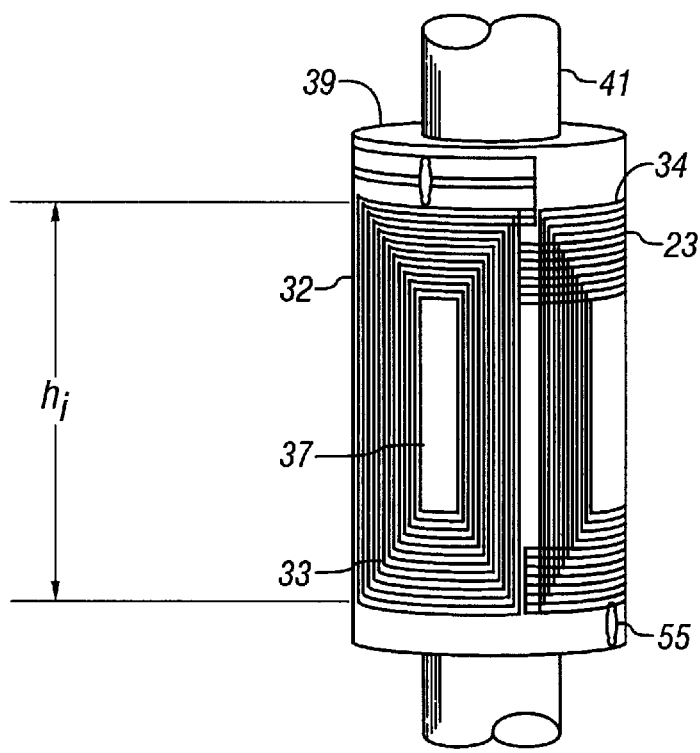
FIG. 4 is a schematic diagram of a transverse electromagnetic apparatus in accord with the invention.

FIG. 4 shows an embodiment of a coil (23) of the invention. The coil (23) is composed of several loops (34) placed one within another. According to an embodiment of the invention, the coil (23) can be obtained by winding a single wire (55) around a central point (37).

The magnetic moments of the transverse dipole antenna embodiments of the invention can be determined as explained below.

Figure 11:
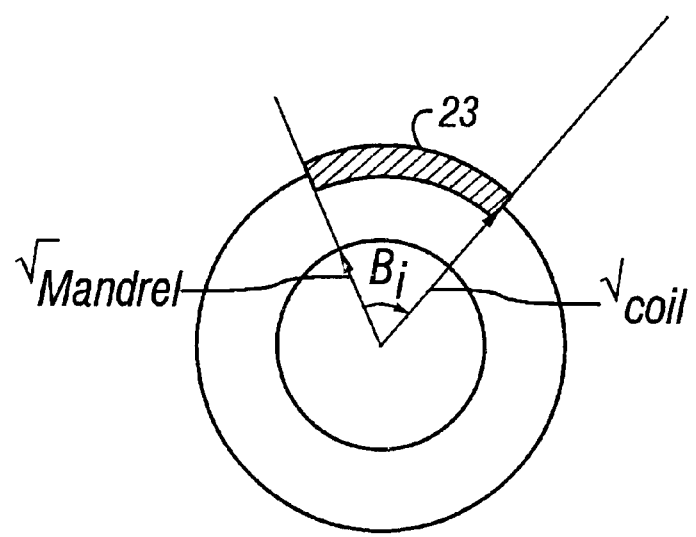
FIG. 11 illustrates a top view of the transverse electromagnetic apparatus as shown in FIG. 4.

The modulus ($M_x$) of the magnetic moment m for a pair of coils (23) is equal to:

$$M_x = 2I_x N_x A_x^{eff} \quad (1)$$

where $I_x$ is the current and $N_x$ is the number of turns and $A_x^{eff}$ is the approximate effective area defined by $$A_x^{eff} = 2\left(r_{coil} - \frac{r_{mandrel}^2}{r_{coil}}\right)\sum_i h_i \sin\left(\frac{\beta_i}{2}\right), \quad (2)$$

where $h_i$ is the saddle coil height, $r_{coil}$ is the arc radius, $r_{mandrel}$ is the inner core radius, and $\beta_i$ is the angle subtended by the arc formed by the coil as can be seen in FIG. 11. This result is a first approximation because the transverse magnetic moment is summed over all the turns forming the coil, since the angle $\beta_i$ changes at each turn. It can be seen from Equation 2 that the magnetic moment can be increased by increasing the height of the coil, where the arc radius is assumed constant.

The modulus of the magnetic moment $M_x$ of a saddle coil can be greater than the modulus of magnetic moment along the longitudinal axis of a solenoid coil for identical currents $I_x$ and $I_z$, where $I_z$ is current of the solenoid coil typically used in well logging instruments. It can be shown that $M_z$, of an axial solenoid wrapped on an insulator about a metal mandrel is $$M_z = I_z N_z A_z^{eff} \quad (3)$$

where $I_z$ is the axial current and $N_z$ is the axial number of turns and $A_z^{eff}$ is the effective area defined by $$A_z^{eff} = \pi(r_{coil}^2 - r_{mandrel}^2) = \pi(r_{coil} - r_{mandrel})(r_{coil} + r_{mandrel}) \quad (4)$$

where $r_{coil}$ is the coil radius.

Next, the transmitter saddle-coil can be examined as a circuit constrained by its electrostatic characteristics. It can be shown that the resistance R, the inductance L, and the capacitance C are all controlled by the geometry of the wire and/or trace. It is desirable to have a high quality factor Q, for example, for the transmitter, Q is defined as $$Q = \frac{\omega_o L}{R}, \quad (5)$$

where $107_o$ is the resonant angular frequency of the circuit, R is the resistance, and L is the self-inductance of the saddle coil. The resistance of the coil is defined as $$R = \frac{\rho l}{A}[1 + \alpha(T - T_0)], \quad (6)$$

where ρ is the resistivity, l is the total length of the wire, T is the temperature, $T_0$ is the reference temperature, and A is the cross sectional area of the conductors that form the corresponding coil, ignoring skin depth effect. The approximate self-inductance of a saddle coil is given by the expression:

$$L = 0.004 \left[ \begin{array}{c} aLn\left(\frac{2a}{\rho}\right) + bLn\left(\frac{2b}{\rho}\right) + 2\sqrt{a^2+b^2} - \\ a\sinh\left(\frac{a}{b}\right) - b\sinh\left(\frac{b}{a}\right) - 2(a+b) + \frac{\mu}{4}(a+b) \end{array} \right] N^{\frac{5}{3}}, \quad (7)$$

where a is the average width of the coil, b is the average height of the coil, ρ is the radius of the wire, $\mu$ is the permeability constant, and N is the number of turns.

It is desirable to obtain a quality factor (shown in Eq. 5) of around 10 to 20 for, for example, a saddle-coil transmitter. This can be achieved by increasing the resonance frequency of the corresponding circuit, increasing L, or decreasing R. A large quality factor Q may be achieved by using higher operating frequencies, with the caveat that the operating frequency affects the depth of investigation. For example, typical induction-type measurements would require frequencies around 15 kHz to 50 kHz. L can be increased by increasing b and/or N, but this would place demands on the magnitude of the capacitor ($\omega_o = 1/\sqrt{LC}$) needed to series or parallel tune, for example, the transmitter circuit. It is also possible to decrease R by increasing the cross sectional area of the conductor.

The self-resonance of the saddle coils is given by $$\omega_s = \frac{1}{\sqrt{LC_{dist}}}, \quad (8)$$

where $C_{dist}$ is the distributed capacitance per unit length of parallel wires. The approximate formula for the capacitance of two parallel wires is $$C_{dist} = \frac{\varepsilon\pi}{\cosh^{-1}\left(\frac{c}{a}\right)}, \quad (9)$$

where c is the distance between the conductors and a is the radius of the conductors. It is preferable that the resonance frequency $\omega_o$ be less than $w_s/3$.

Examination of the derived equations shows that the values of R, L, and C for the coils (23) can be controlled by varying, for example, the coil height $h_i$ and the number of turns N that form the coil. Equation 6 shows that the resistance R can be varied by altering these parameters. Similarly, the capacitance C can be controlled by either increasing or decreasing the distance between the conductors that form each turn, as derived from Equation 9.

A transverse EM apparatus (32) according to one of the embodiments of the invention is shown in FIG. 4. The apparatus consists of a core (39) made out of dielectric material on which a plurality of coils (23) are mounted. The dielectric material can be ceramic, fiberglass, or other suitable materials and composites known in the art. According to one embodiment of the invention, the core (39) consists of an annular cylinder in which a metal rod (41) is inserted.

Figure 5A:
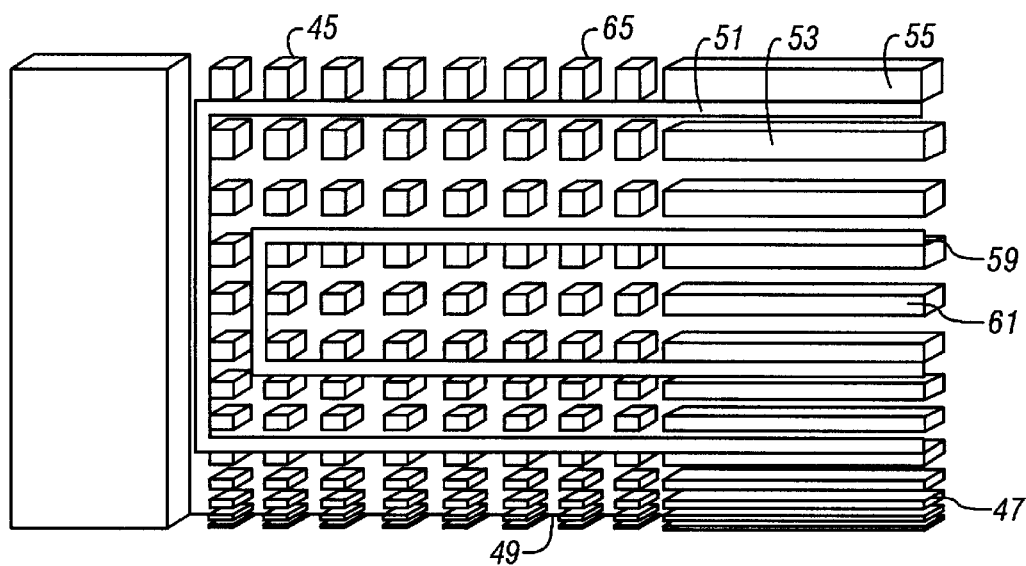
FIG. 5a is a diagram of a core structure of a transverse electromagnetic apparatus in accord with the invention.
Figure 5B:
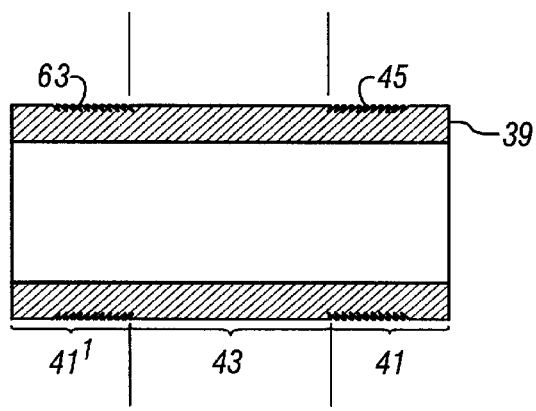

The invention includes several configurations for disposing the coils (23) on the core (39). FIGS. 5a and 5b show a core (39) in which specific cuts have been made to guide and retain the loops. The core (39) is composed of pin sections (41,41') and a channel section (43). The pin sections (41,41') are located at the core's ends and include a plurality of pins (45) in a matrix type arrangement. The channel section (43) is located between the pin sections (41,41') and is formed by a plurality of channels (47) that are parallel to the core's longitudinal axis (represented by a dashed line in FIG. 5b) and aligned with the channels (49) formed between the columns of the pin's matrix arrangement. The channels (49) provide guiding paths for inserting the conductors or wires (55) that form the coil(s).

A loop (51) is formed by inserting the wire in the channels (47) and wrapping a desired area (53) that includes both pin sections (41,41') and the channel section (43). For example, in order to form a loop, the wire (55) is inserted at one pin section (41') in a channel (49), the wire is then turned at a selected pin (45) and brought to the opposite pin section (41) by introducing it in the corresponding channels (47) of the channel section (43). Similarly, at the opposite pin section (41) the wire, exiting the channel (47) from the channel section (43), enters a corresponding channel (49). The wire (55) follows the channel (49) till the desired pins (45) are reached where the wire (55) is turned around and returned to the other pin section (41') through a corresponding channel (47). An additional loop (59) can be placed within a previously made loop (51) by repeating the procedure to cover a smaller area (61). The transverse EM apparatus (32) of FIG. 4 is an embodiment made by repeating this procedure to form a structure with as many coils as desired.

In one embodiment of the invention the pins (45) are slanted with respect to the core's (39) outer surface (63). The slanting is directed toward the core (39) ends. The pins' orientation enables the wire (55) to be maintained in contact with the core's outer surface (63). Thus the wire (55) is also maintained within the corresponding channels (49). The slanted pins (45) also permit the wires to be held tighter to the core's outer surface, eliminating slack in the wire. The corners (65) of the slanted pins may be rounded to avoid damage to the wire (55).

Figure 6:
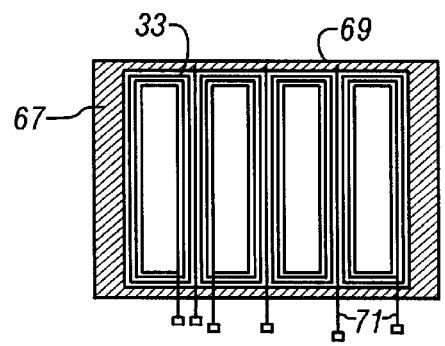
FIG. 6 is a schematic diagram of a coil assembly in accord with the invention.

FIG. 6 shows another embodiment of the invention. In this embodiment, the coils (33) are affixed to an insulating sheet (67) according to the desired pattern. The coils (33) may be formed from any suitable electrical conductor, including wire or metallic foil. Alternatively, the coils may be formed by the deposition of conductive films on the insulating sheet as known in the art. Adhesives (e.g. polyimides, epoxies, and acrylics) may be used to bond the conductor to the insulating sheet.

In the embodiment of FIG. 6, a plurality of coils (33) are disposed side by side and placed on an insulating sheet (67) to form a flexible circuit (69). Conductors (71) provide the corresponding electrical connection for energizing the coils (33). The flexible circuit (69) can be conformed about the core's exterior and attached to it via adhesives or mechanical fasteners. The insulating sheet can be any electrically non-conductive or dielectric film substrate, such as polyimide film or a polyester film having a thickness selected to enable bending or flexing. Methods used to produce the insulating sheet are described in U.S. Pat. No. 6,208,031, incorporated by reference. The conductors (71) that are used to interconnect the coils (33) are preferably placed on the layers closest to the outside diameter of the invention. This aids in minimizing conductor (71) compression and forces the conductors (71) into tension, which greatly improves the reliability of the invention.

The invention also includes techniques for mutually balancing a dipole antenna. FIGS. 7a and 7b show independently mutually balanced dipole antenna (73,74) embodiments of the invention. One technique entails selecting one or more loops within a main coil (75,76). The selected loops constitute a separate coil (77, 78), referred to as a mutual balancing coil.

A mutual balancing process of the invention entails cutting or leaving out several loops between the mutual balancing coil (77,78) and the main coil (75,76), thereby leaving a gap (79,80) between the coils, as shown in FIGS. 7a and 7b. In FIG. 7b, the mutual balancing arrangement is adapted to the core (74) as describe above, having channels to host the corresponding mutual balancing coil (78) and main coil (76), separated by a gap (80).

Figure 7C:
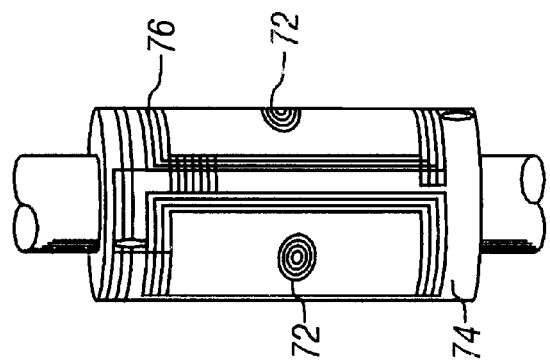
FIG. 7c is a schematic diagram of another mutual balancing coil configuration in accord with the invention.
Figure 7B:
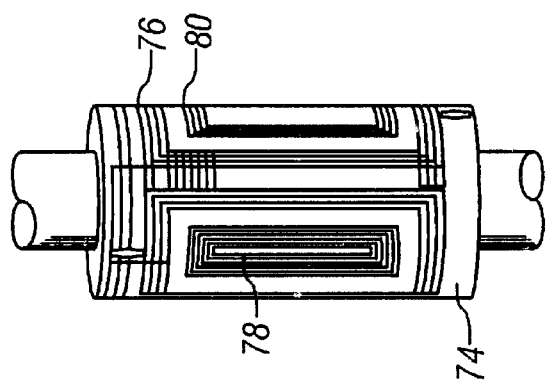
FIG. 7b is a schematic diagram of another mutual balancing coil configuration in accord with the invention.
Figure 7A:
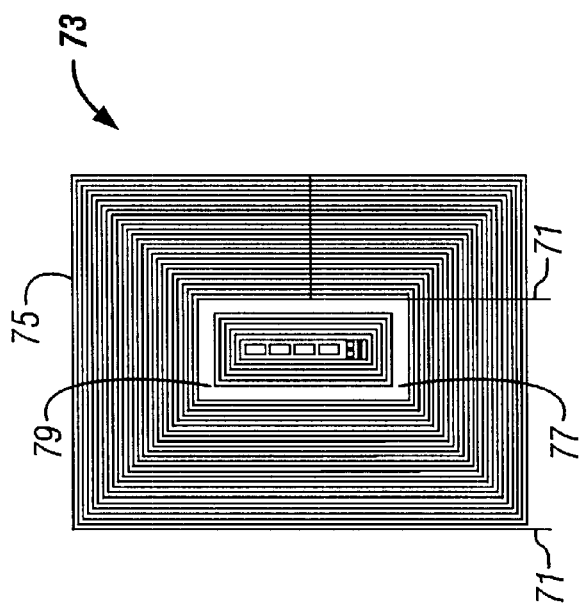
FIG. 7a is a schematic diagram of a mutual balancing coil configuration in accord with the invention.

FIG. 7c shows another antenna (74) embodiment of the invention adapted for mutual balancing. According to this embodiment, individual conductive elements or disks (72) are placed on the antenna within the main coil (76). This embodiment allows one to balance the antenna by placing appropriately sized disks (72) on the antenna until the desired balancing is achieved. The disks (72) may be formed of any conductive element, e.g. copper. The disks (72) may be bonded or affixed to the substrate using any suitable adhesive. The disk(s) (72) may also be placed within a recess formed in the substrate itself (not shown). Alternatively, the disk(s) may also be affixed to the sealer or potting compound (not shown) commonly used to mount antennas on logging instruments as known in the art.

The interleaved conductive loops forming the balancing coils (77,78) and the conductive disks (72) excite opposing currents (by Lenz's law) that oppose the generated magnetic field to effectively reduce the magnetic moment of the main coil (75,76). These mutually balancing antennas of the invention provide greater flexibility for the placement of receiver arrays at different points along the tool axis. The mutual balancing antenna configurations of the invention may be used as receiver or bucking antennas.

Figure 8:
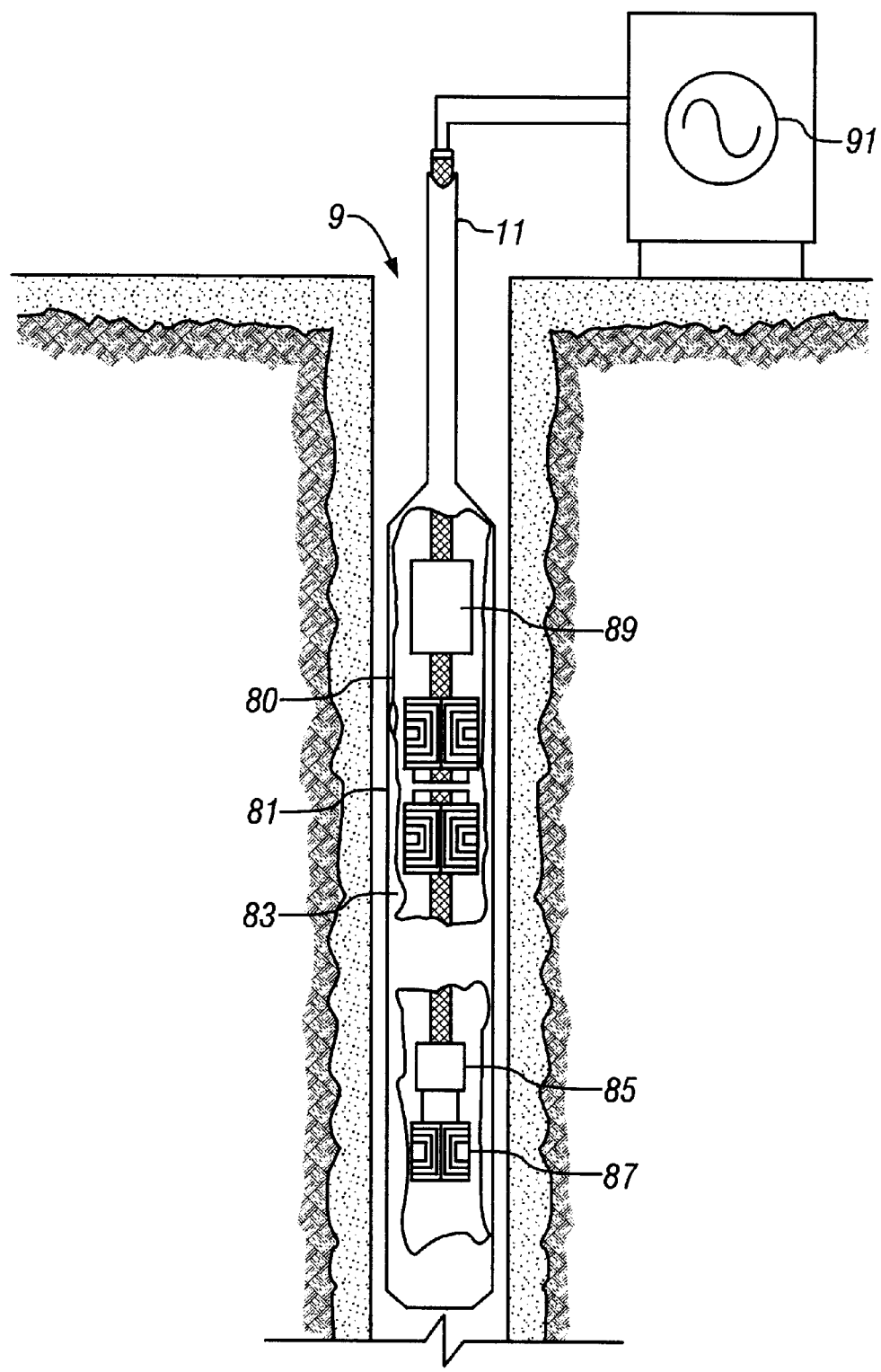
FIG. 8 is a schematic diagram of a logging tool implementation in accord with the invention.

FIG. 8 shows a logging tool (80), according to one embodiment of the invention, disposed within a well on a wireline (11). The tool (80) has a transmitter antenna (81), a bucking antenna (83), and a receiver antenna (87). The bucking antenna (83) can be connected in inverse polarity to either the transmitter antenna (81) or to the receiver antenna (87). Transmitter electronic circuitry (89) is connected to the transmitter antenna (81) to provide time-varying electric currents to induce time-varying magnetic fields. Power supply (91) feeds the circuitry (89). Receiver circuitry (85) is connected to the receiver antenna (83) to detect and measure resulting EM signals.

According to one embodiment of the invention, the bucking antenna (83) can be omitted by using a transmitter antenna (81) or a receiver antenna (87) adapted for independent mutual balancing as shown in FIGS. 7a, 7b, and 7c.

Figure 9:
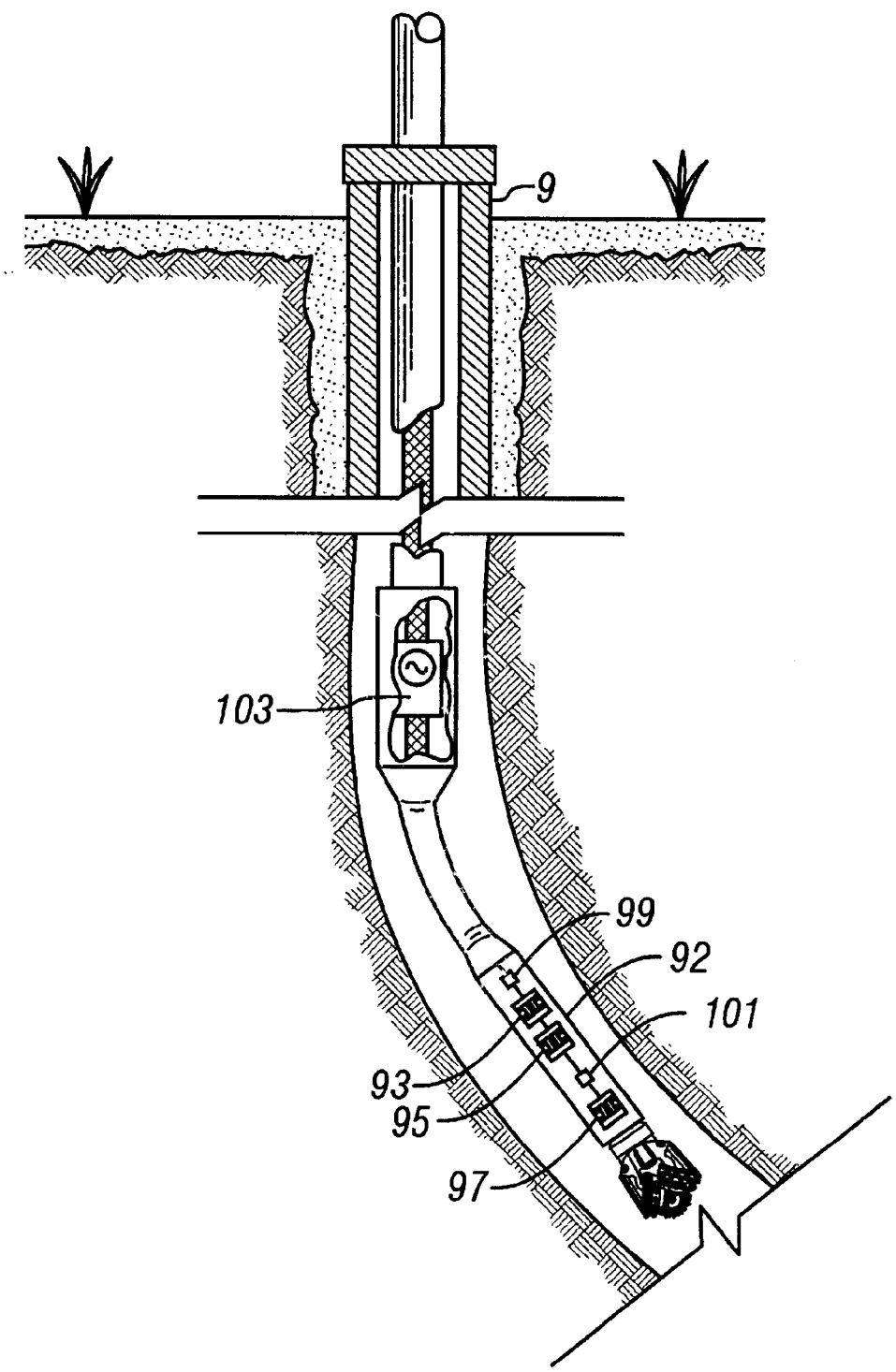
FIG. 9 is a schematic diagram of another logging tool implementation in accord with the invention.

FIG. 9 shows a drilling tool (92) disposed in a well (9) according to one embodiment of the invention. The drilling tool (92) has a transmitter antenna (93), a bucking antenna (95), and a receiver antenna (97). The bucking antenna (95) can be connected with an inverse polarity to either the transmitter antenna (93) or to the receiver antenna (97). The transmitter electronic circuitry (99) is connected to the transmitter antenna (93) to provide time-varying electric currents to induce time-varying magnetic fields. Power supply (103) feeds the circuitry (99). Receiver circuitry (101) is connected to the receiver antenna (97) to detect and measure resulting EM signals. The bucking antenna (95) may also be omitted in another embodiment by using antennas adapted for independent mutual balancing as shown in FIGS. 7a, 7b, and 7c. However, this may reduce effectiveness where one desires $M_x$, $M_y$, $M_z$ to have a common origin.

Those skilled in the art will appreciate that the antenna apparatus of the invention are not limited to use in any one particular type of measurement or exploration operation and that they may be disposed within a well bore on any type of support member, e.g., on coiled tubing, drill collars, or wireline tools.

Parameters for the independently mutually balanced antennas (77, 78) of the invention are now presented. Cancellation of the undesired mutual coupling results in the following relationship:

$$\frac{N_B A_B}{L_B^3} = \frac{N_R A_R}{L_R^3}, \tag{10}$$

where the subscripts B and R represent the mutual balancing coil and the receiver coil, respectively, and N is the number of turns, A is the effective area of the coil, and L is the distance from the transmitter coil.

Solving Equation 10 for $A_B$ gives the expression:

$$A_B = \frac{N_R}{N_B}\left(\frac{L_B}{L_R}\right)^3 A_R. \tag{11}$$

Translation of the transverse coil for a small $\Delta L_b$ is problematic, therefore a comparable $\Delta A_B$ is added. To this end, the following relationship of a physical derivative is considered:

$$\Delta A_B = \frac{dA_B}{dL_B}\Delta L_B \tag{12}$$

For this statement to be true, the loop of area $\Delta A_B$ should have an inductance much greater than its DC resistance. This is generally true because the resistance of a loop is typically in the sub-milli-ohm range. The inductance of a small circular loop of wire is:

$$L_0 = \mu(2r-a)\left[\left(1-\frac{k^2}{2}\right)K(k) - E(k)\right], \tag{13}$$

where a is the conductor radius, r is the loop radius, K(k) and E(k) are elliptic integrals, and $$k^2 = \frac{4r(r-a)}{(2r-a)^2}. \tag{14}$$

Put another way, this loop should generate a small opposing complex voltage in the receiver/bucking coil circuit. Equation 12 can be rewritten as $$\Delta A_B = 3A_R \Delta L_B \left(\frac{N_R}{N_B}\right)\frac{L_B^2}{L_R^3}. \tag{15}$$

The bucking loop radius can thus be shown to be $$r = \sqrt{\frac{\Delta A_B}{\pi}} \text{ or } r = \left(\frac{3A_R \Delta L_B}{\pi L_B}\right)^{1/2}. \tag{16}$$

Figure 10:
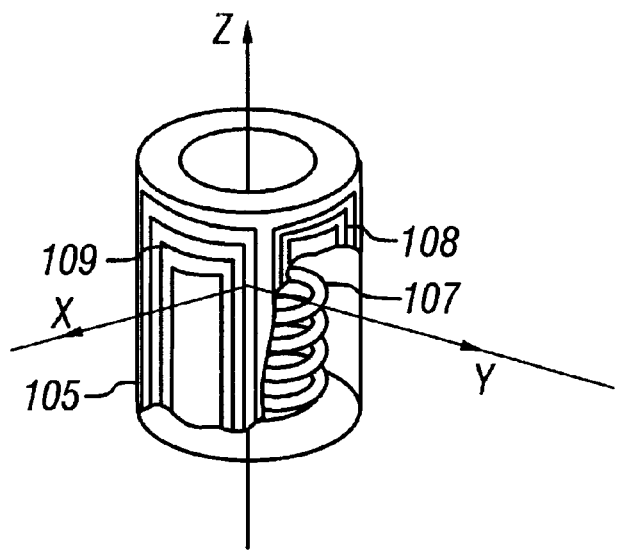
FIG. 10 is a schematic diagram of an antenna configuration in accord with the invention.

FIG. 10 shows an arrangement for a transmitter or receiver antenna according to an embodiment of the invention. This arrangement consists of a transverse EM antenna pair (105) (similar to FIG. 4) combined with a solenoid coil (107) oriented so that its dipole moment is parallel to the longitudinal axis of the instrument (represented by the z-axis). The solenoid coil (107) is surrounded by coils (109) that have their magnetic moments perpendicular to the solenoid's magnetic moment.

While the invention has been described with respect to a limited number of embodiments, those skilled in the art, having benefit of this disclosure, will appreciate that other embodiments can be devised which do not depart from the scope of the invention as disclosed herein. For example, the antennas of the invention may be configured with multiple dielectric substrates overlaying one another to achieve modified couplings or to alter the magnetic moment(s) as desired. Using multiple-layered substrates would allow for antennas to be collocated on the support, e.g., a bucking and a receiver antenna. It will also be appreciated that the embodiments of the invention are not limited to any particular material for their construction. Any suitable material or compounds (presently known or developed in the future) may be used to form the embodiments of the invention provided they allow for operation as described herein. Accordingly, the scope of the invention should be limited only by the attached claims.

What is claimed is:

1. An antenna for an electromagnetic well logging tool, comprising:
    a core, the core including a substantially cylindrical outer surface, the outer surface having channels and pins adapted to retain a first electrical conductor in a predetermined pattern, the first electrical conductor disposed in the channels;
    the predetermined pattern adapted to cause the antenna to have a first magnetic dipole moment substantially perpendicular to a longitudinal axis of the core.

2. The antenna according to claim 1 further comprising a second conductor disposed in the channels and adapted to cause the antenna to have a second magnetic dipole moment substantially perpendicular to the longitudinal axis of the core and substantially perpendicular to the first magnetic dipole moment.

3. The antenna according to claim 2 further comprising a third electrical conductor adapted to cause the antenna to have a third magnetic dipole moment substantially perpendicular to the first and second magnetic moments and substantially parallel to the longitudinal axis of the core, the first, second and third magnetic moments intersecting at a common point along the axis.

4. The antenna according claim 3 wherein the first and second electrical conductor form at least one loop having first and second sides and first and second ends, the first and second sides disposed in the channels and the first and second ends retained by the pins.

5. The antenna according to claim 4 wherein the pins each comprise at least one slanted surface adapted to retain the electrical conductors.

6. The antenna according to claim 3 wherein the third conductor comprises a solenoid coil.

7. The antenna according to claim 1 wherein the core is annular.

8. The antenna according to claim 1 wherein the core comprises a dielectric material.

9. The antenna according to claim 1 wherein the first electrical conductor forms at least one loop having first and second sides and first and second ends, the first and second sides disposed in the channels and the first and second ends retained by the pins.

10. The antenna according to claim 9 wherein the pins each comprise at least one slanted surface adapted to retain the electrical conductor.

11. The antenna according to claim 1 further comprising an independent electrical conductor disposed on the core and positioned within the predetermined pattern, the conductor adapted to alter the first magnetic moment.

12. The antenna according to claim 11 wherein the independent conductor forms a closed loop.

13. The antenna according to claim 11 wherein the independent conductor forms a disk.

14. An antenna for an electromagnetic logging tool, comprising:
   a core formed of a dielectric material;
   an electrical conductor disposed on a dielectric substrate, the substrate wrapped around the core and the conductor disposed such that the antenna has a first magnetic dipole moment substantially perpendicular to a longitudinal axis of the core.

15. The antenna according to claim 14 further comprising a second electrical conductor disposed on the substrate such that the antenna has a second magnetic dipole moment substantially perpendicular to the longitudinal axis of the core and perpendicular to the first magnetic dipole moment.

16. The antenna according to claim 15 further comprising an additional electrical conductor disposed therein and adapted such that the antenna has a third magnetic dipole moment substantially perpendicular to the first and second magnetic moments and substantially parallel to the longitudinal axis of the core.

17. The antenna according to claim 16 wherein the additional conductor comprises a solenoid coil.

18. The antenna according to claim 14 wherein the core is annular.

19. The antenna according to claim 14 wherein the electrical conductor comprises at least one of wire, metal foil, and deposited conductive film.

20. The antenna according to claim 14 further comprising an independent electrical conductor disposed on the substrate, the optional conductor adapted to alter the first magnetic moment.

21. The antenna according to claim 20 wherein the independent conductor forms a closed loop.

22. The antenna according to claim 20 wherein the independent conductor forms a disk.

23. The antenna according to claim 14 further comprising a second dielectric substrate overlaid atop the first substrate and wrapped around the core, the second substrate having an electrical conductor disposed therein.

24. An antenna for an electromagnetic logging tool, comprising:
   a core, having a substantially cylindrical outer surface, the outer surface having channels and pins adapted to retain electrical conductors in a predetermined pattern, the predetermined pattern adapted to cause first and second electrical conductors to have a first and second magnetic dipole moment substantially perpendicular to a longitudinal axis of the core, the first and second electrical conductors disposed in the channels and adapted to have the second magnetic dipole moment pointing in a different direction from the first magnetic moment.

25. The antenna according to claim 24 further comprising a third conductor adapted to cause the antenna to have a third magnetic dipole moment substantially perpendicular to the first and second magnetic moments and substantially parallel to the longitudinal axis of the core.

26. The antenna according to claim 25 wherein the third conductor comprises a solenoid coil.

27. The antenna according claim 24 wherein the first and second electrical conductors each form at least one loop having first and second sides and first and second ends, the first and second sides disposed in the channels and the first and second ends retained by the pins.

28. The antenna according to claim 24 wherein at least one pin comprises a slanted surface adapted to retain an electrical conductor.

29. The antenna according to claim 24 wherein the core comprises an annular cylinder.

30. The antenna according to claim 25 wherein the core comprises a dielectric material.

31. The antenna according to claim 24 further comprising at least one independent electrical conductor disposed on the core and positioned within the predetermined pattern, the conductor adapted to alter the first or second magnetic moment.

32. The antenna according to claim 31 wherein each at least one independent conductor forms a closed loop.

33. The antenna according to claim 31 wherein each at least one independent conductor forms a disk.

34. An antenna for an electromagnetic logging tool, comprising:
   a core;
   an electrical conductor disposed on a dielectric substrate, the substrate wrapped around the core, the conductor forming first and second conductive paths, the first and second conductive paths arranged to have a first and second magnetic dipole moment substantially perpendicular to a longitudinal axis of the core, the first and second magnetic dipole moments pointing in different directions.

35. The antenna according to claim 34 further comprising an additional conductor adapted to cause the antenna to have a third magnetic dipole moment substantially perpendicular to the first and second magnetic moments and substantially parallel to the longitudinal axis of the core.

36. The antenna according to claim 35 wherein the additional conductor comprises a solenoid coil.

37. The antenna according to claim 34 wherein the core comprises an annular cylinder.

38. The antenna according to claim 34 wherein the core comprises a dielectric material.

39. The antenna according to claim 34 wherein the conductor comprises at least one of wire, metal foil, and deposited conductive film.

40. The antenna according to claim 34 further comprising an independent electrical conductor disposed on the substrate and adapted to alter the first or second magnetic moment.

41. The antenna according to claim 40 wherein the independent conductor forms a closed loop.

42. The antenna according to claim 40 wherein the independent conductor forms a disk.

43. The antenna according to claim 34 further comprising a second dielectric substrate overlaid atop the first substrate and wrapped around the core, the second substrate having an electrical conductor disposed therein.

44. A well togging tool comprising:
a support having at least one antenna mounted thereon; and
processing circuitry electrically coupled to the at least one antenna,
wherein the at least one antenna comprises a core having a substantially cylindrical outer surface, the outer surface having channels and pins adapted to retain at least one electrical conductor in a predetermined pattern, the predetermined pattern arranged such that first and second electrical conductors disposed in the channels have a first and second magnetic dipole moment substantially perpendicular to a longitudinal axis of the core, the first magnetic dipole moment pointing in a direction different from the second magnetic dipole moment.

45. The well logging tool according to claim 44 further comprising a third conductor adapted to cause the antenna to have a third magnetic dipole moment substantially perpendicular to the first and second magnetic moments and substantially parallel to the longitudinal axis of the core, the first, second and third magnetic moments intersecting at a common point.

46. The well logging tool according to claim 45 wherein the third conductor comprises a solenoid coil.

47. The well logging tool according to claim 44 wherein the first and second electrical conductors each form at least one loop having first and second sides and first and second ends, the first and second sides disposed in the channels and the first and second ends retained by the pins.

48. The well logging tool according to claim 44 wherein at least one pin comprises a slanted surface adapted to retain the electrical conductor.

49. The well logging tool according to claim 44 wherein the core comprises an annular cylinder.

50. The well logging tool according to claim 44 wherein the core comprises a dielectric material.

51. The well logging tool according to claim 44 wherein the support comprises least two antennas mounted thereon.

52. The well logging tool according to claim 51 wherein at least one antenna is a transmitter and at least one antenna is a receiver.

53. The well logging tool according to claim 44 wherein the support is adapted for disposal within a well bore on one of a wireline, a drill collar, or coiled tubing.

54. The well logging tool according to claim 44 the at least one antenna further comprising an independent electrical conductor disposed on the core and positioned within the predetermined pattern, the conductor adapted to alter the first or second magnetic moment.

55. The well logging tool according to claim 54 wherein the independent conductor forms a closed loop.

56. The well logging tool according to claim 54 wherein the independent conductor forms a disk.

57. A well logging tool comprising:
a support having at least one antenna mounted thereon; and
processing circuitry electrically coupled to the at least one antenna,
wherein the at least one antenna comprises a dielectric substrate wrapped around a core, the substrate having an electrical conductor disposed thereon, the conductor forming first and second conductive paths, the first and second conductive paths arranged to have a first and second magnetic dipole moment substantially perpendicular to a longitudinal axis of the core, the first and second magnetic moments pointing in different directions.

58. The well logging tool according to claim 57 further comprising an additional conductor adapted to cause the antenna to have a third magnetic dipole moment substantially perpendicular to the first and second magnetic moments and substantially parallel to the longitudinal axis of the core.

59. The well logging tool according to claim 58 wherein the additional conductor comprises a solenoid coil.

60. The well logging tool according to claim 57 wherein the core comprises an annular cylinder.

61. The well logging tool according to claim 57 wherein the core comprises a dielectric material.

62. The well logging tool according to claim 57 wherein the electrical conductor comprises at least one of wire, metal foil, and deposited conductive film.

63. The well logging tool according to claim 57 wherein the support comprises least two antennas mounted thereon.

64. The well logging tool according to claim 63 wherein at least one antenna is a transmitter and at least one antenna is a receiver.

65. The well logging tool according to claim 57 wherein the support is adapted for disposal within a well bore on one of a wireline, a drill collar, or coiled tubing.

66. The well logging tool according to claim 57, the antenna further comprising an independent electrical conductor disposed on the substrate and adapted to alter the first or second magnetic moment.

67. The well logging tool according to claim 66 wherein the independent conductor forms a closed loop.

68. The well logging tool according to claim 66 wherein the independent conductor forms a disk.

69. The well logging tool according to claim 57, the antenna further comprising a second dielectric substrate overlaid atop the first substrate and wrapped around the core, the second substrate having an electrical conductor disposed therein.

* * * * *